US010340820B2

(12) United States Patent
Woodworth et al.

(10) Patent No.: US 10,340,820 B2
(45) Date of Patent: Jul. 2, 2019

(54) ELECTRICAL SYSTEM FOR UNMANNED AERIAL VEHICLES

(71) Applicant: Wing Aviation LLC, Mountain View, CA (US)

(72) Inventors: Adam Woodworth, Santa Clara, CA (US); Greg Vulikh, Redwood City, CA (US); John FitzSimons, San Jose, CA (US)

(73) Assignee: Wing Aviation LLC, Mountain View, CA (US)

( * ) Notice: Subject to any disclaimer, the term of this patent is extended or adjusted under 35 U.S.C. 154(b) by 141 days.

(21) Appl. No.: 15/395,996

(22) Filed: Dec. 30, 2016

(65) Prior Publication Data
US 2018/0186464 A1 Jul. 5, 2018

(51) Int. Cl.
| | |
|---|---|
| G06F 7/00 | (2006.01) |
| H02P 5/00 | (2016.01) |
| B64C 39/02 | (2006.01) |
| H02P 6/16 | (2016.01) |

(52) U.S. Cl.
CPC .............. *H02P 5/00* (2013.01); *B64C 39/024* (2013.01); *B64C 2201/042* (2013.01); *B64C 2201/104* (2013.01); *B64C 2201/108* (2013.01); *B64C 2201/141* (2013.01); *B64C 2201/146* (2013.01); *H02P 6/16* (2013.01)

(58) Field of Classification Search
CPC ... H02P 5/00; B64C 39/024; B64C 2201/146; B64C 2201/141; B64C 2201/042; B64C 2201/108; B64C 2201/104
See application file for complete search history.

(56) References Cited

U.S. PATENT DOCUMENTS

| | | | | | |
|---|---|---|---|---|---|
| 4,571,157 | A | * | 2/1986 | Eickmann | ............... B64C 39/00 416/158 |
| 4,770,371 | A | * | 9/1988 | Eickmann | ............... B64C 11/28 244/17.23 |
| 4,784,351 | A | * | 11/1988 | Eickmann | ............... B64C 29/00 244/56 |

(Continued)

OTHER PUBLICATIONS

International Search Report, dated Apr. 17, 2018, issued in connection with International Application No. PCT/US2017/068122.

*Primary Examiner* — Khoi H Tran
*Assistant Examiner* — Jorge O Peche
(74) *Attorney, Agent, or Firm* — McDonnell Boehnen Hulbert & Berghoff LLP

(57) ABSTRACT

An example unmanned aerial vehicle includes a power source, a processor module having one or more processors, and a plurality of boom arms, each boom arm being couplable to a printed circuit board (PCB) and a plurality of propellers. In the example UAV, a PCB of each boom arm includes a power hub electrically couplable to the power source and to corresponding propellers of the boom arm, and a signal hub electrically couplable to at least one processor of the processor module and to the corresponding propellers. Further, in the example UAV, the power hub of each PCB is configured to transfer power from the power source to the corresponding propellers, and wherein the signal hub of each PCB is configured to transfer signals from the processor module to the corresponding propellers such that the processor module controls the plurality of propellers.

20 Claims, 13 Drawing Sheets

(56) References Cited

U.S. PATENT DOCUMENTS

| | | | | |
|---|---|---|---|---|
| 4,856,732 | A * | 8/1989 | Eickmann | B64C 27/20 244/2 |
| 4,925,131 | A * | 5/1990 | Eickmann | B64C 11/28 244/123.9 |
| 8,181,901 | B2 * | 5/2012 | Roesch | B64C 27/26 244/17.19 |
| 9,957,042 | B1 * | 5/2018 | Vander Lind | B64C 29/0033 |
| 2008/0210809 | A1 * | 9/2008 | Arlton | A63H 27/02 244/17.11 |
| 2009/0283629 | A1 | 11/2009 | Kroetsch et al. | |
| 2010/0329838 | A1 * | 12/2010 | Greenblatt | B64C 23/005 415/1 |
| 2011/0315809 | A1 * | 12/2011 | Oliver | B64C 29/0033 244/12.4 |
| 2012/0056041 | A1 | 3/2012 | Rhee et al. | |
| 2012/0091284 | A1 * | 4/2012 | Goodarzi | B64C 39/024 244/23 A |
| 2012/0286102 | A1 * | 11/2012 | Sinha | B64C 15/00 244/7 B |
| 2013/0251525 | A1 * | 9/2013 | Saiz | B64C 27/26 416/23 |
| 2014/0062754 | A1 * | 3/2014 | Mohamadi | F41H 11/136 342/22 |
| 2014/0062758 | A1 * | 3/2014 | Mohamadi | F41H 11/136 342/53 |
| 2014/0097290 | A1 * | 4/2014 | Leng | B64C 29/0025 244/6 |
| 2014/0222246 | A1 * | 8/2014 | Mohamadi | G01S 13/913 701/2 |
| 2014/0244078 | A1 * | 8/2014 | Downey | G05D 1/0055 701/11 |
| 2014/0332620 | A1 * | 11/2014 | Earon | B64C 39/024 244/13 |
| 2015/0001336 | A1 * | 1/2015 | Eglin | B64C 27/04 244/6 |
| 2015/0136897 | A1 * | 5/2015 | Seibel | B64C 29/0033 244/6 |
| 2015/0336670 | A1 | 11/2015 | Zhang | |
| 2015/0344134 | A1 * | 12/2015 | Cruz Ayoroa | B64C 29/0033 244/48 |
| 2016/0083075 | A1 * | 3/2016 | Moxon | B64C 3/385 244/13 |
| 2016/0093124 | A1 * | 3/2016 | Shi | G07C 5/0808 701/2 |
| 2016/0200436 | A1 * | 7/2016 | North | B64C 29/0033 244/7 R |
| 2016/0221676 | A1 | 8/2016 | Fisher et al. | |
| 2016/0244158 | A1 * | 8/2016 | Fredericks | B64C 25/52 |
| 2016/0297520 | A1 * | 10/2016 | Sada-Salinas | B64C 29/0025 |
| 2017/0137150 | A1 * | 5/2017 | Conyers | B64F 1/007 |
| 2017/0158322 | A1 * | 6/2017 | Ragland | B64C 29/0025 |
| 2017/0192422 | A1 * | 7/2017 | Kim | G03B 15/006 |
| 2017/0369163 | A1 * | 12/2017 | Carlin | B64C 29/02 |
| 2018/0057163 | A1 * | 3/2018 | Sababha | B64C 39/024 |
| 2018/0106619 | A1 * | 4/2018 | Johnson | G01C 21/18 |
| 2018/0134381 | A1 * | 5/2018 | Rimanelli | B64D 47/08 |
| 2018/0215465 | A1 * | 8/2018 | Renteria | B64C 29/0033 |
| 2018/0237148 | A1 * | 8/2018 | Hehn | B64C 39/024 |
| 2018/0257448 | A1 * | 9/2018 | Schreiner | B60F 5/02 |
| 2018/0273170 | A1 * | 9/2018 | D'Sa | B64C 29/02 |
| 2018/0281941 | A1 * | 10/2018 | Hutson | B64C 29/0016 |
| 2018/0370624 | A1 * | 12/2018 | Seale | B64C 27/24 |

* cited by examiner

US 10,340,820 B2

ELECTRICAL SYSTEM FOR UNMANNED AERIAL VEHICLES

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Example systems may relate to an unmanned aerial vehicle (UAV), an electrical system of a UAV, and an electrical system within a wing of a UAV. The UAV may include a power source, a processor module, and printed circuit boards (PCBs), each PCB being configured to transfer power from the power source to a plurality of propellers, and signals from the processor module to a plurality of propellers.

In one example, a UAV is provided that includes a power source, a processor module having one or more processors, and a plurality of boom arms, each boom arm being couplable to a printed circuit board (PCB) and a plurality of propellers. In the example UAV, a PCB of each boom arm includes a power hub electrically couplable to the power source and to corresponding propellers of the boom arm, and a signal hub electrically couplable to at least one processor of the processor module and to the corresponding propellers. Further, in the example UAV, the power hub of each PCB is configured to transfer power from the power source to the corresponding propellers, and wherein the signal hub of each PCB is configured to transfer signals from the processor module to the corresponding propellers such that the processor module controls the plurality of propellers.

In another example, an electrical system of a UAV is provided that includes a power source, a processor module having one or more processors, and a plurality of propellers including a plurality of subsets of propellers. In the example electrical system, each subset of propellers corresponds to one of a plurality of boom arms of the UAV, and a plurality of printed circuit boards (PCBs). Also, in the example system, each PCB of the plurality corresponds to one of the plurality of boom arms. Further, in the example system, a PCB of each boom arm include a power hub electrically couplable to the power source and to a corresponding subset of propellers of the boom arm, and a signal hub electrically couplable to at least one processor of the processor module and to the corresponding subset of propellers. Additionally, the power hub of each PCB is configured to transfer power from the power source to the corresponding subset of propellers, and wherein the signal hub of each PCB is configured to transfer signals from the processor module to the corresponding subset of propellers such that the processor module controls the plurality of propellers.

In another example, an electrical system within a wing of a UAV is provided that includes a power source, a processor module having one or more processors, and a plurality of printed circuit boards (PCBs). In the example system, the plurality of PCBs each includes a power hub electrically couplable to the power source and to a plurality of propellers, and a signal hub electrically couplable at least one processor of the processor module and to the plurality of propellers. Further, in the example system, the power hub of each PCB is configured to transfer power from the power source to the plurality of propellers, and wherein the signal hub of each PCB is configured to transfer signals from the processor module to the plurality of propellers associated with the PCB such that the processor module controls the plurality of propellers.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1A:
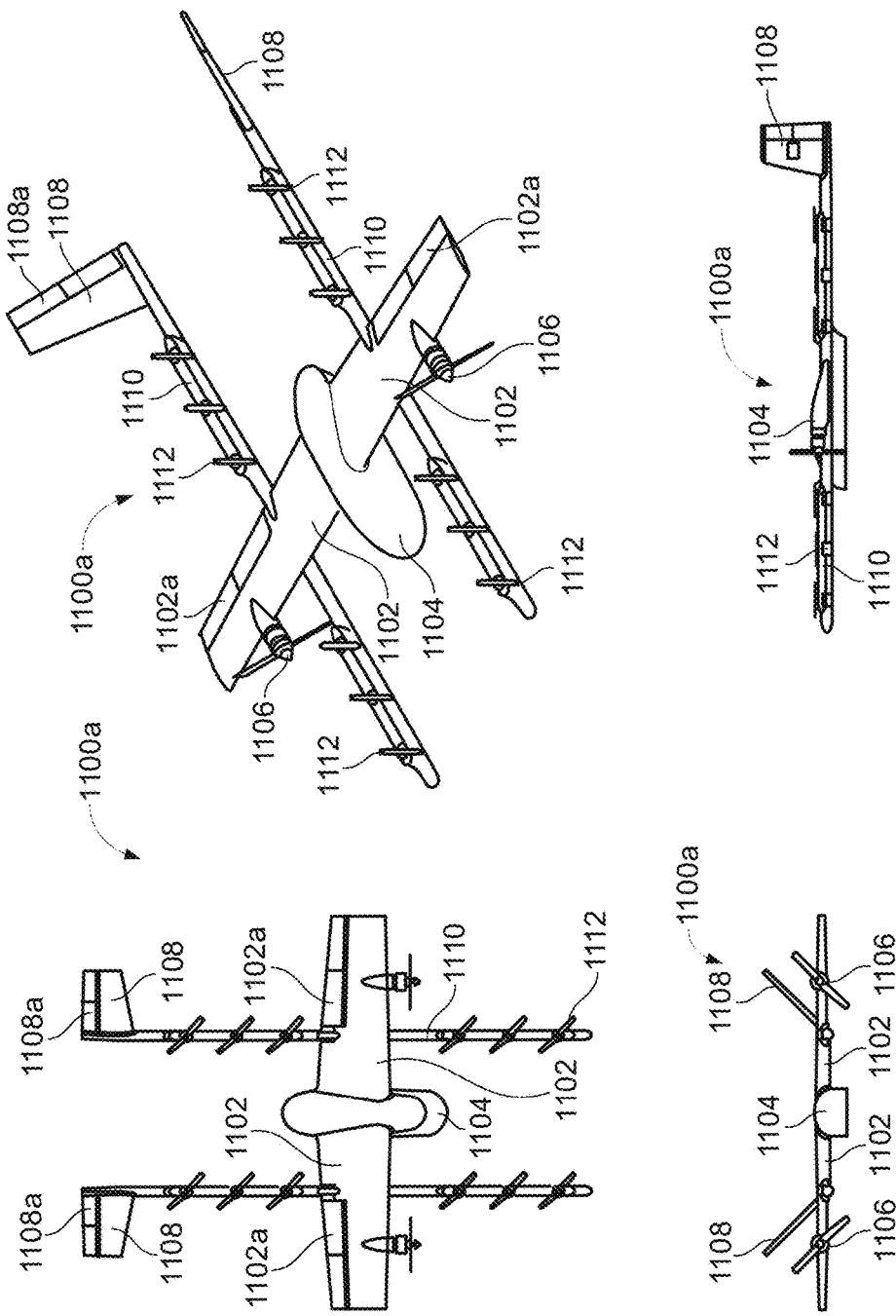
FIG. 1A is a simplified illustration of an unmanned aerial vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

Example embodiments may include or otherwise relate to unmanned aerial vehicles and electrical systems of unmanned aerial vehicles. For example, an unmanned aerial vehicle (UAV) may include a power source and a processor module having one or more processors. The UAV may further include a plurality of booms arms, each of the plurality of boom arms having a corresponding plurality of propellers. Each of the boom arms may correspond to a printed circuit board (PCB). Each PCB may be configured to transfer power from the power source to the corresponding plurality of propellers and to transfer signals from the processor module to the corresponding plurality of propellers such that the propellers are controllable by the processor module.

In some examples, each PCB may include a power hub and a signal hub. The power hub may be electrically couplable to the power source and to the corresponding plurality of propellers. Each PCB may transfer power to corresponding plurality of propellers via the power hub. The signal hub may also be electrically couplable to the processor module and to the corresponding plurality of propellers. Each PCB may transfer signals of the processor module to the corresponding plurality of propellers via the signal hub.

In some examples, the UAV may also include a sensor module having one or more sensors electrically couplable to the processor module. The processor module may determine control signals for the plurality of propellers based on sensor data of the one or more sensors. The signal hub of each PCB may be configured to transfer the control signals to the corresponding propellers such that the propellers are controllable by the sensor module based at least in part on the sensor data of the sensor module.

In some examples, the UAV may additionally include a wing. The plurality of PCBs may be incorporated into the wing. The wing may additionally include one or more sensors of the sensor module. The wing may also include a plurality of propellers. The propellers of the wing may also be controllable by the processor module. In some examples, the plurality of PCBs may be incorporated into the wing during an injection molding process of the wing.

Incorporating the PCBs into the UAV may allow for effective power transfer to and control of the plurality of propellers while efficiently using space. For example, each of the PCBs may be positioned on a boom arm of the UAV. The boom arm may be thin by design, but may nonetheless accommodate a PCB due to a low profile of the PCB. Further, incorporating the PCBs into the UAV for power transfer and signal transfer to the plurality of propellers may allow for simple assembly and repair of an electrical system of the UAV. For example, having a separate PCB for each boom arm would reduce the need to install wiring harnesses for each boom arm. Further, if one PCB were to malfunction, another could be installed in its place rather than having to replace an entire electrical system of the UAV.

Including multiple separate PCBs may also allow for redundancy in the UAV design. For example, if one PCB were to malfunction, other PCBs would still be able to control corresponding propellers and safely guide the UAV to the ground. Further, using multiple redundant PCBs may simplify manufacture by allowing the same part to be used in separate areas of the UAV. For example, one PCB may be used to control three propellers of one boom arm, while another PCB of the same design may be used to control four propellers of another boom arm.

In some examples, each PCB may include at least one processor. In these examples, each PCB may act as a controller area network (CAN) node of a CAN bus, and the at least one processor may act as a CAN controller and transceiver of a CAN node. In these examples, the processor module may include a central processor and each processor of the plurality of PCBs. The central processor may act as a central processing unit of the CAN bus. In this way, the processor module may dynamically control the plurality of propellers based on communication between the various CAN nodes and the central processing unit. For example, sensors of the UAV may indicate that the UAV is in a windy environment that affects a pitch or yaw of the UAV. The processing module may apply a proportional-integral-derivative (PID) control to the propellers to correct for the effects of the wind.

In further examples, one or more booms of the UAV may include additional components that are controllable by the processor module. For example, one or more of the booms may include a tail of the unmanned UAV and a corresponding servo. The tail may move in response to a movement of the corresponding servo. In these examples, the PCB associated with the boom may be configured to transfer signals from the processor module to the servo such that the tail is controllable by the processor module.

In still other examples, the power transfer modules of each PCB may include selector switches configured to transmit power to or withhold power from each of the propellers. In these examples, the selector switches may be controlled by the processor module. In other examples, they may be controlled by circuitry of the PCB.

II. ILLUSTRATIVE UNMANNED VEHICLES

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is a simplified illustration providing various views of a UAV, according to an example embodiment. In particular, FIG. 1A shows an example of a fixed-wing UAV 1100a, which may also be referred to as an airplane, an aeroplane, a biplane, a glider, or a plane, among other possibilities. The fixed-wing UAV 1100a, as the name implies, has stationary wings 1102 that generate lift based on the wing shape and the vehicle's forward airspeed. For instance, the two wings 1102 may have an airfoil-shaped cross section to produce an aerodynamic force on the UAV 1100a.

As depicted, the fixed-wing UAV 1100a may include a wing body or fuselage 1104. The wing body 1104 may contain, for example, control electronics such as an inertial measurement unit (IMU) and/or an electronic speed controller, batteries, other sensors, and/or a payload, among other possibilities. The illustrative UAV 1100a may also include landing gear (not shown) to assist with controlled take-offs and landings. In other embodiments, other types of UAVs without landing gear are also possible.

The UAV 1100a further includes propulsion units 1106 positioned on the wings 1106 (or fuselage), which can each include a motor, shaft, and propeller, for propelling the UAV 1100a. Stabilizers 1108 (or fins) may also be attached to the UAV 1110a to stabilize the UAV's yaw (turn left or right) during flight. In some embodiments, the UAV 1100a may be also be configured to function as a glider. To do so, UAV 1100a may power off its motor, propulsion units, etc., and glide for a period of time. In the UAV 1100a, a pair of rotor supports 1110 extend beneath the wings 1106, and a plurality of rotors 1112 are attached rotor supports 1110. Rotors 1110 may be used during a hover mode wherein the UAV 1110a is descending to a delivery location, or ascending following a delivery. In the example UAV 1100a, stabilizers 1108 are shown attached to the rotor supports 1110.

During flight, the UAV 1100a may control the direction and/or speed of its movement by controlling its pitch, roll, yaw, and/or altitude. For example, the stabilizers 1108 may include one or more rudders 1108a for controlling the UAV's yaw, and the wings 1102 may include one or more elevators for controlling the UAV's pitch and/or one or more ailerons 1102a for controlling the UAV's roll. As another example, increasing or decreasing the speed of all the propellers simultaneously can result in the UAV 1100a increasing or decreasing its altitude, respectively.

Figure 1B:
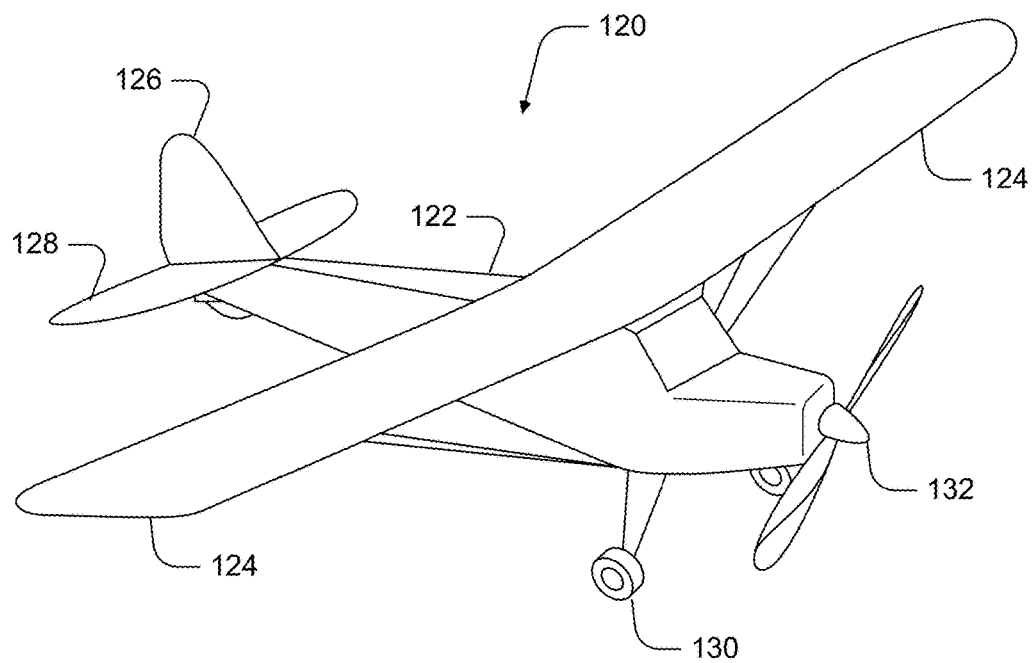
FIG. 1B is a simplified illustration of an unmanned aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
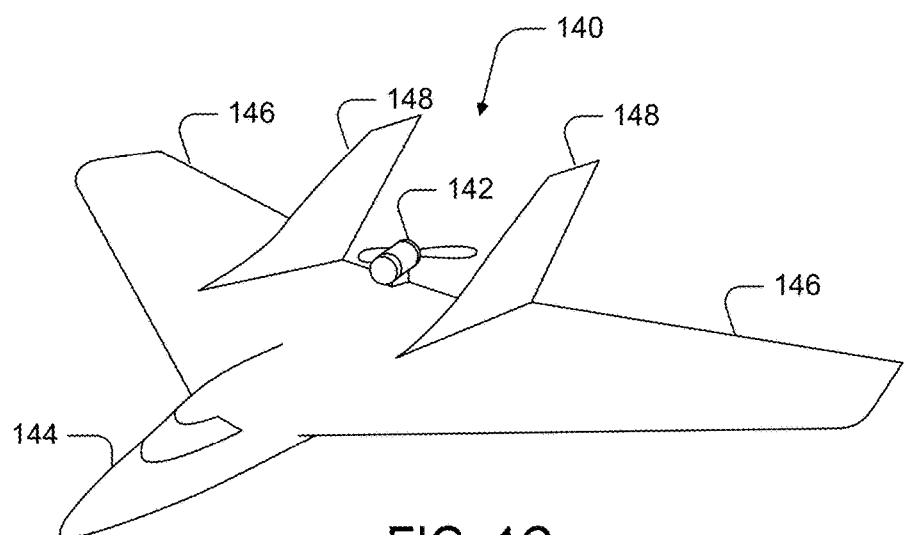
FIG. 1C is a simplified illustration of an unmanned aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
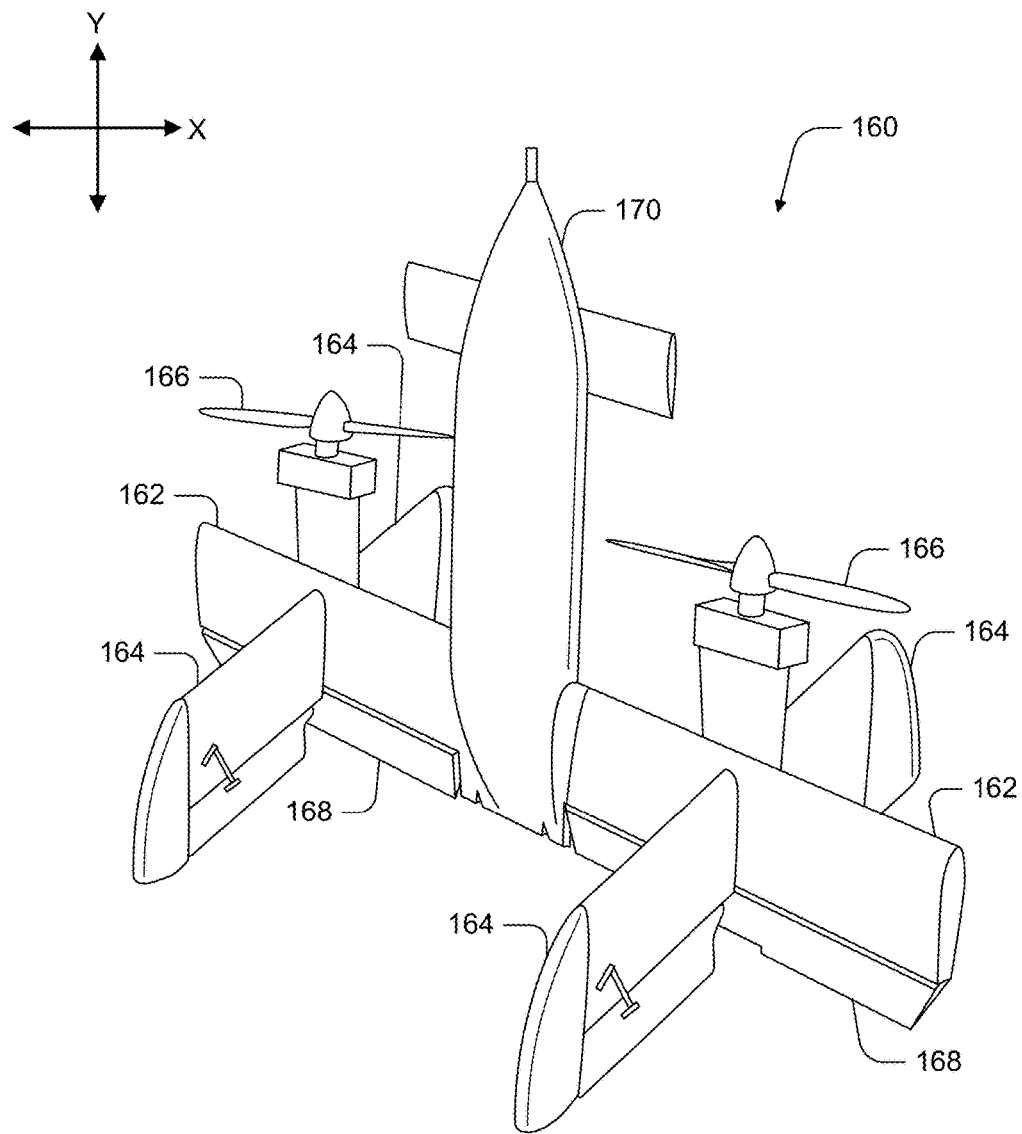
FIG. 1D is a simplified illustration of an unmanned aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
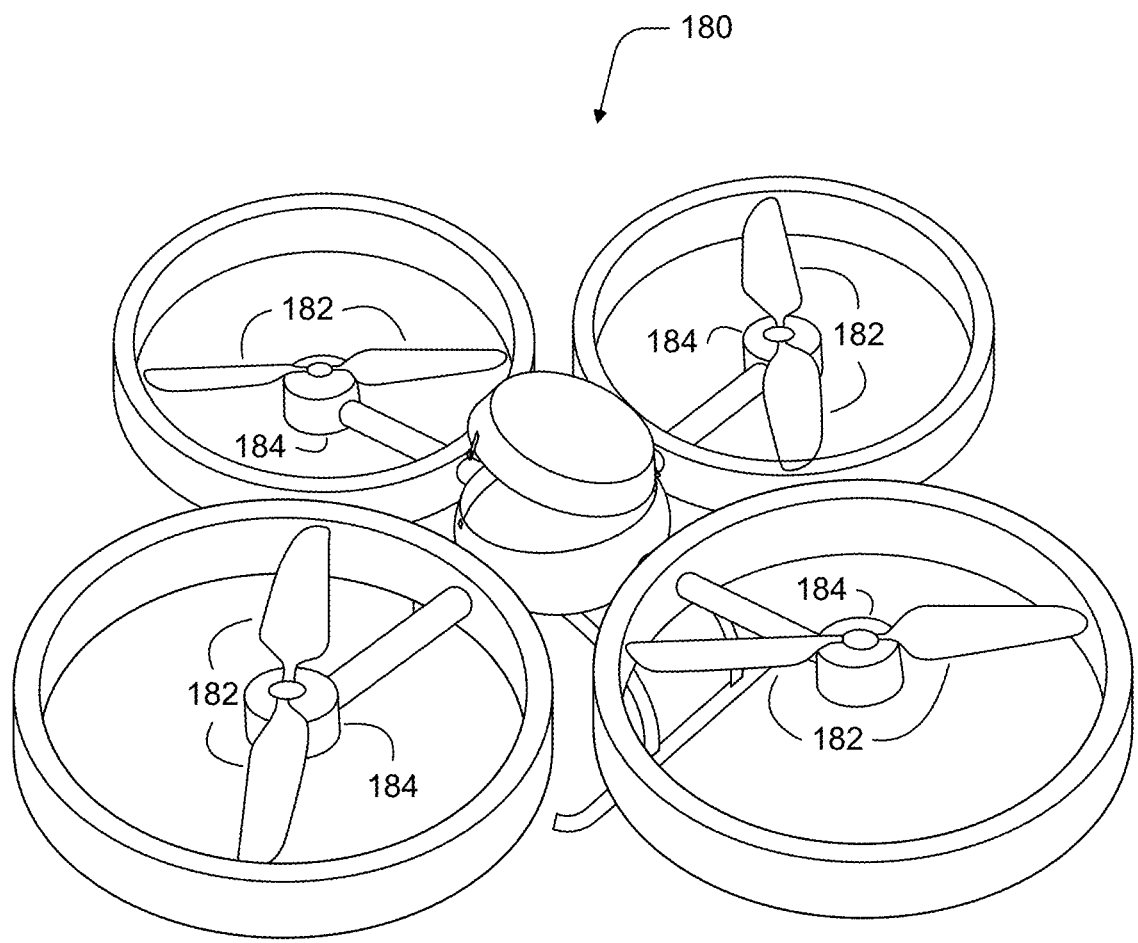
FIG. 1E is a simplified illustration of an unmanned aerial vehicle, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

Figure 2:
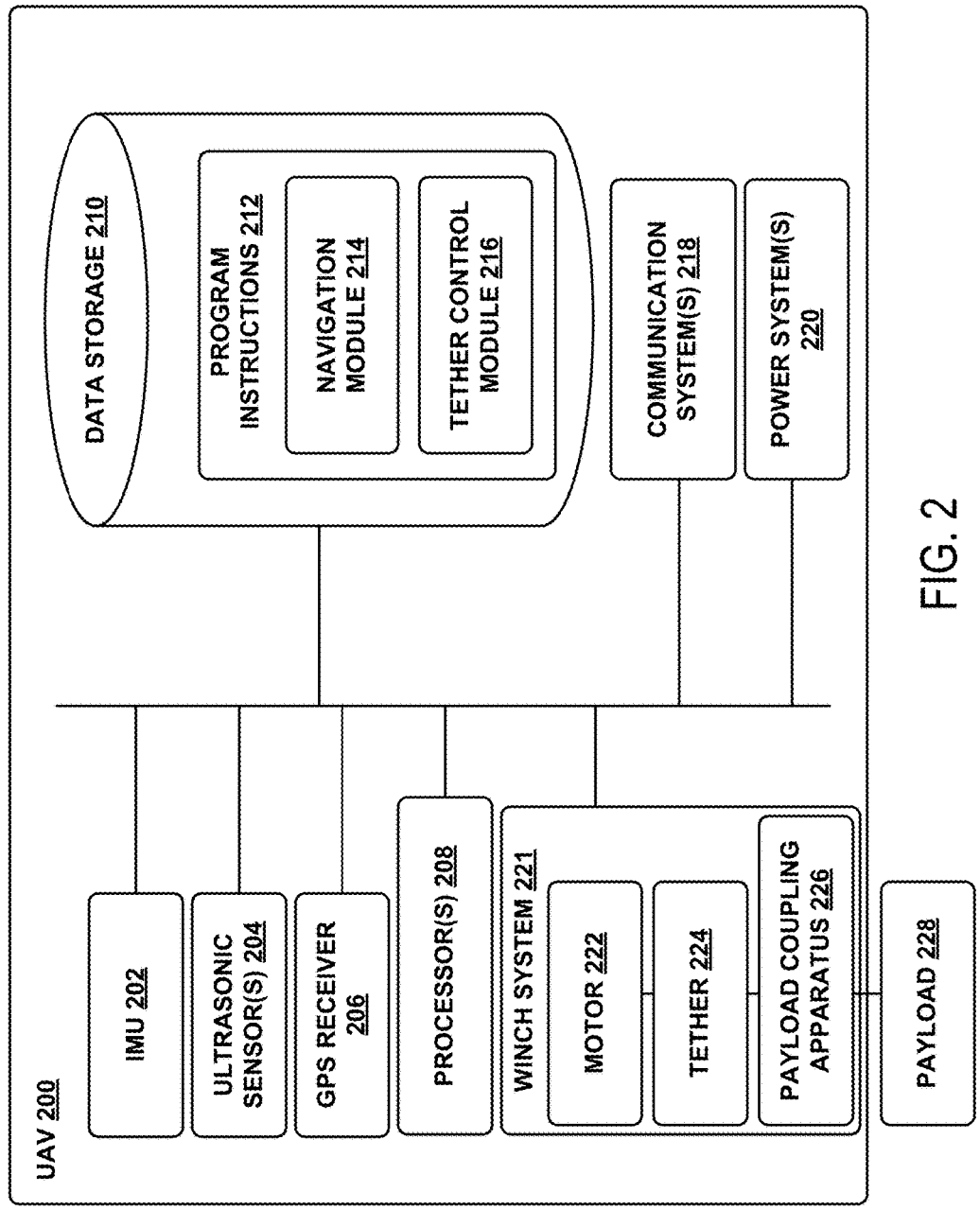
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine latitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. ILLUSTRATIVE ELECTRICAL SYSTEM DESIGN

Figure 3:
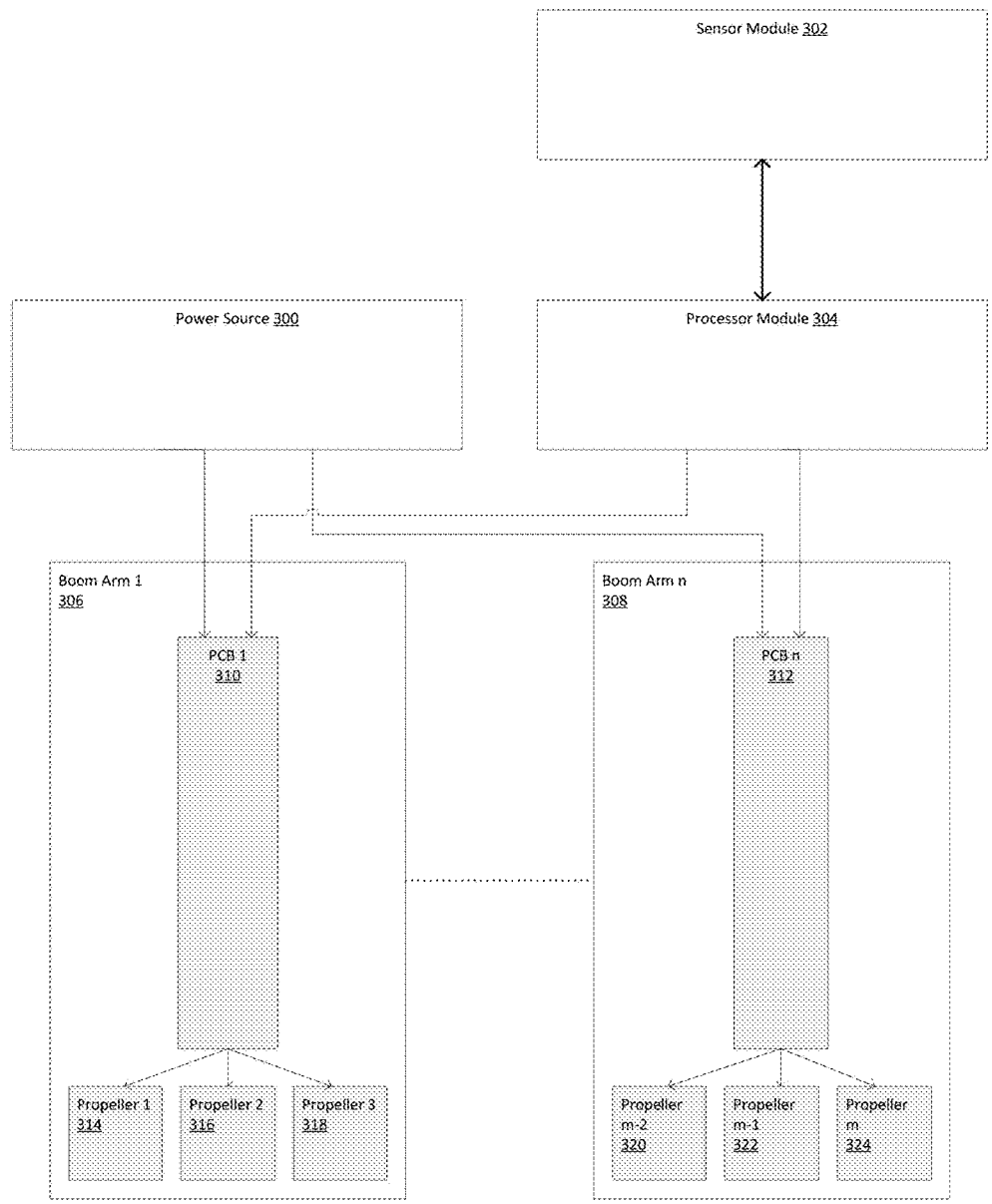
FIG. 3 is a block diagram of an electrical system of an unmanned aerial vehicle, according to an example embodiment.

FIG. 3 is a block diagram of an electrical system of an unmanned aerial vehicle, according to an example embodiment. The UAV may include a power source 300. The power source 300 may be, for example, a battery. The UAV may also include a sensor module 302. The sensor module 302 may include a plurality of sensors dispersed throughout the UAV. For example, the plurality of sensors may include transceivers, a global positioning system, and avionics sensors. Other sensors are possible as well.

The unmanned aerial vehicle may also include a processor module 304. The processor module may include one or more processors. For example, the processor module may simply include one central processing unit that controls all controllable elements of the UAV. The controllable elements may include propellers and servos of the vehicle. Other controllable elements are possible as well.

The UAV may also include a plurality of boom arms. In the present example, boom arm 306 and boom arm 308 are featured, but more boom arms may be included as well. The boom arms may be supportive members of the UAV. For example, the boom arms may support an octocopter configuration of the UAV. In another example, the boom arms may support a quadcopter configuration of the UAV. Other configurations are possible as well. In these examples, the booms may be supportive of one or more propellers. In the present example, boom arm 306 supports propellers 314, 316, and 318, while boom arm 308 supports propellers 320, 322, and 324.

The UAV may also include a plurality of printed circuit boards (PCBs). One or more PCBs may correspond to each boom arm of the aerial vehicle. In turn, the PCBs may correspond to the propellers of the boom arms. The PCBs may be configured to transmit both power and control signals to corresponding propellers of the boom arms. For example, in the present embodiment, PCB 310 associated with boom arm 306 transmits power from the power source 300 and signals from the processor module 304 to propellers 314, 316, and 318 of the boom arm. Likewise, PCB 312 transmits power from the power source 300 and signals from the processor module 304 to propellers 320, 322, and 324. In the present example, PCBs 310 and 312 may be physically incorporated into boom arms 306 and 308, respectively. Alternatively, the PCBs 310 and 312 may be incorporated into other parts of the UAV, and may be electrically coupled to the propellers of boom arms 306 and 308.

In some examples, the UAV may also include a sensor module 302. The sensor module may include one or more sensors. The processor module 304 may receive sensor data from the one or sensors and make control decisions based on the received sensor data. The control decisions may take the form of control signals. The PCBs 310 and 312 may transfer the control signals to propellers 314, 316, and 318, and 320, 322, and 324 respectively. In this way, the processor module 304 may control the propellers based, at least in part, on sensor data of the sensor module 302.

Figure 4:
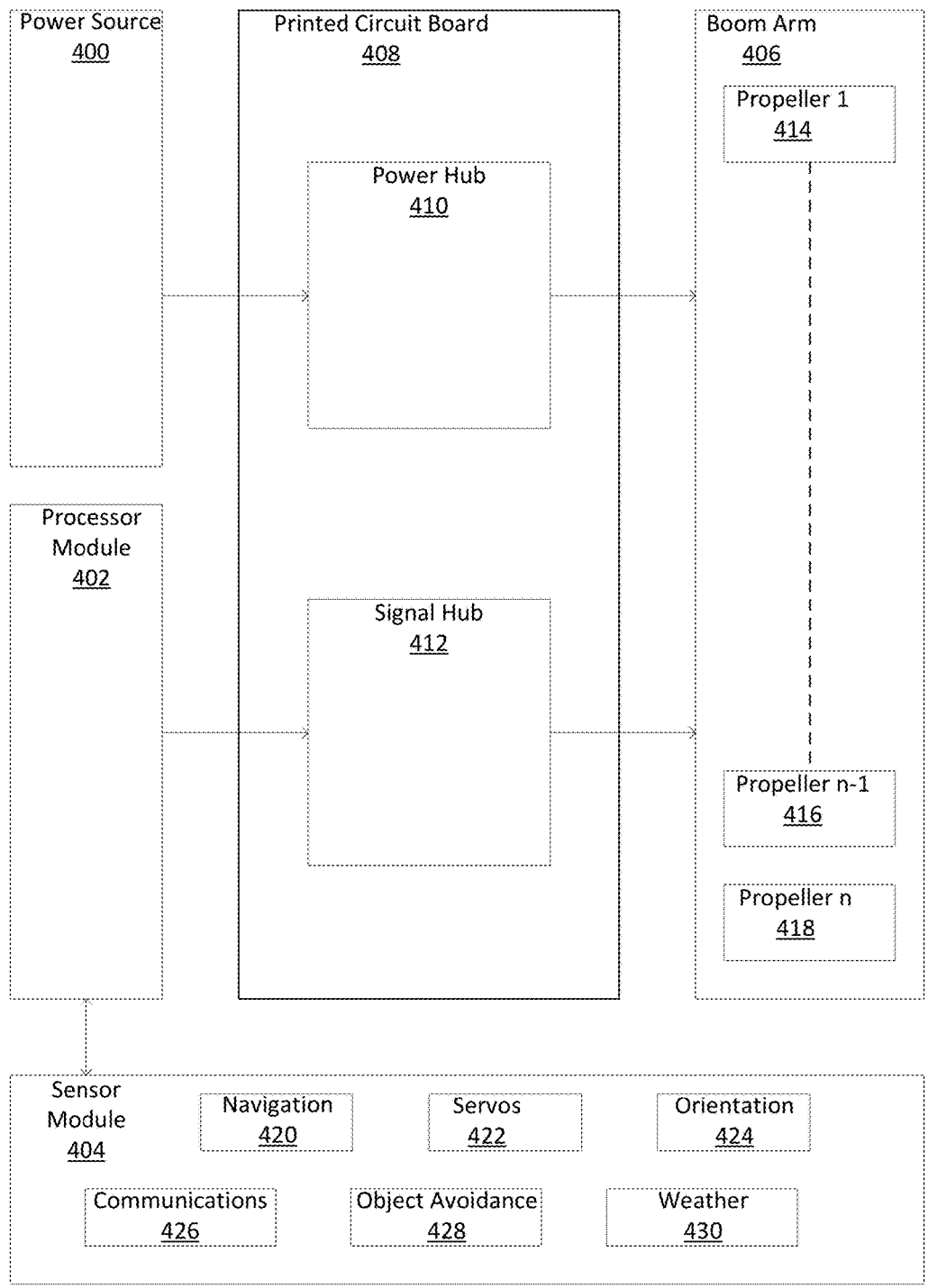
FIG. 4 is a block diagram of a printed circuit board of an unmanned aerial vehicle interacting with other components of the unmanned aerial vehicle, according to an example embodiment.

FIG. 4 is a block diagram of a printed circuit board of an unmanned aerial vehicle interacting with other components of the unmanned aerial vehicle, according to an example embodiment. Similar to the embodiment described in relation to FIG. 3, the present example includes a power source 400, processor module 402, and a sensor module 404. The present example also includes a PCB 408 having a power hub 410 and a signal hub 412. In some examples, the power hub 410 may transfer power to propellers 414, 416, and 418 of boom arm 406. Though the present example presents three propellers, other embodiments may include fewer or more propellers. Further, other embodiments may include other controllable elements of the UAV, such as one or more servos or sensors.

The power hub 410 may be configured to withhold power from one or more of propellers 414, 416, and 418, in addition to providing power to the propellers. For example, circuitry may be provided to connect or disconnect one or more of the propellers from the power source 400. For example, a selector switch may be used. In some examples, a fuse or comparator circuit of the PCB 408 may disengage the selector switch when a threshold current has been met that may damage the propellers. In another each of the boom arms may correspond to a printed circuit board (PCB). Each PCB may be configured to transfer power from the power source to the corresponding plurality of propellers, the processor module 402 may be configured to engage or disengage the selector switch based on control decisions of the processor module.

Also included in the present example is signal hub 412, which transfers signals from the processor module to propellers 414, 416, and 418. In this example, the processor module only sends signals to the propellers. However, in some examples, the propellers may be configured to provide feedback to the processor module, such as through a motor controller of each propeller. In these examples, the processor module 402 may update its control decisions based on the feedback from the propellers. The processor module 402 may also use sensor data of the sensor module 404 to update its control decisions. In some examples, the processor module may use feedback from the propellers in conjunction with sensor data to make control decisions.

The signal hub 412 of PCB 408 may be electrically coupled to one or more processors of the processor module 402. For example, PCB 408 may physically incorporate a processor, such as a microprocessor, of the processor module 402, and the signal hub 412 may be electrically coupled to the incorporated processor. In these examples, the PCB may act as a controller area network (CAN) node of a CAN network. The processor of the PCB may interpret CAN signals from a central processor of the CAN network, or from other CAN nodes of the network, to control the propellers via the signal hub. In some examples, the processor of the PCB may interpret pulse width modulation (PWM) signals to control the propellers. Other types of signals are possible as well. The processor of the PCB may act as a CAN controller and CAN transceiver of the CAN node. In other examples, the PCB may physically incorporate more than one processor of the processor module. For example, one processor of the PCB may serve as a transceiver of the CAN node, while a second processor of the PCB may serve as a CAN controller of the CAN node.

The present embodiment includes sensor module 404. The sensor module may include various types of sensors and controllable elements of the UAV. For example, the sensor module 404 in the present example includes navigation sensors 420, servos 422, orientation sensors 424, communications sensors 426, object avoidance sensors 428, and weather sensors 430. Any or all of these sensors may be configured to provide sensor data to the processor module 402, and the processor module 402 may use the sensor data to arrive at control decisions. The processor module may 402 may rely one or more control contexts of the vehicle to determine whether to use sensor data from some sensors while excluding data from other sensors in the determination. For example, in a landing context, the processor module may rely on the object avoidance sensors 428, weather sensors 430, and orientation sensors 424 to the exclusion of navigation sensors 420. Other control contexts are possible as well.

Figure 5:
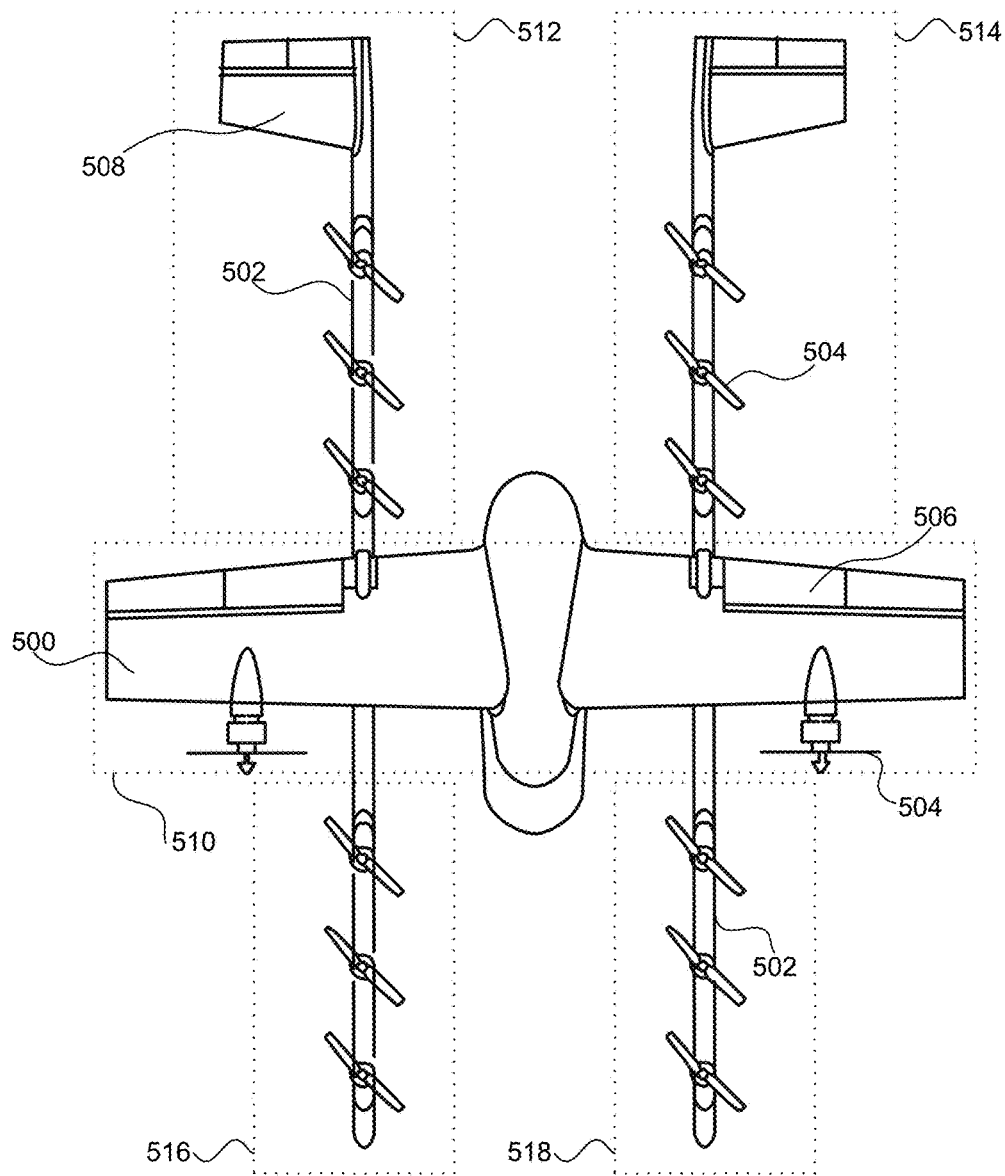
FIG. 5 is a top down view of an unmanned aerial vehicle having a plurality of control zones controllable by a processor module of the unmanned aerial vehicle, according to an example embodiment.

FIG. 5 is a top down view of an unmanned aerial vehicle having a plurality of control zones controllable by a processor module of the unmanned aerial vehicle, according to an example embodiment. In the present example, the UAV includes a wing 500 and four boom arms 502. Each of the boom arms 502 includes a subset of the total number of propellers of the UAV. In the present example, each boom arm includes three propellers 504, but in other examples different boom arms may include different numbers of propellers. Additionally, the wing 500 includes a pair of propellers 504.

In the present example, the UAV includes control zones 510, 512, 514, 516, and 518. A control zone may be a portion of the UAV that is individually controllable by the processor module. Each of these control zones may have a corresponding PCB. Each PCB may be configured to transfer power and signals to the controllable elements of the control zone. For example, a single PCB may be associated with control zone 512, which includes three propellers 504 and a tail 508. The PCB may be configured to transfer power and signals to each of the three propellers 504 and to the tail 508. Control zones 510, 514, 516, and 518 also may each include a PCB that interacts similarly with the controllable elements of a corresponding control zone.

In some examples, different control zones may include different controllable elements. For example, control zones 516 and 518 each include three propellers 504. Control zone 510 includes two propellers and four wing flaps 506, and control zones 512 and 514 each include three propellers 504 and a tail 508. Similarly, different control zones may include different structural elements. In the present example, control zone 510 includes wing 500, while control zones 512, 514, 516, and 518 include boom arms 502. In some examples, the PCBs associated with each control zone may be different based on the associated structural elements of controllable elements of the control zone. In other examples, each PCB may be configured to accommodate differences between control zones. For example, the PCB associated with control zone 516 may include extra electrical leads that would correspond to a tail 508 or a wing flap 506. This may allow versatile use of the PCBs that could accommodate changes in structural or electrical design of the UAV.

In some examples, an electrical system of the UAV may be substantially associated with a wing of the UAV. For example, the processor module and sensor module may be substantially incorporated into wing 500. The PCBs may also be incorporated into the wing. Thus controllable elements of control zones 512, 514, 516, and 518 may simply be electrically coupled to exposed electrical leads of the PCBs that have been incorporated into the wing, while all other critical components of the electrical system may reside in the wing. In some examples, some of the electrical components may be incorporated into the wing during manufacturing of the wing. For example, the PCBs may be incorporated into the wing during an injection molding process of the wing. Other methods of incorporating the PCBs into the wing are possible as well.

Figure 6:
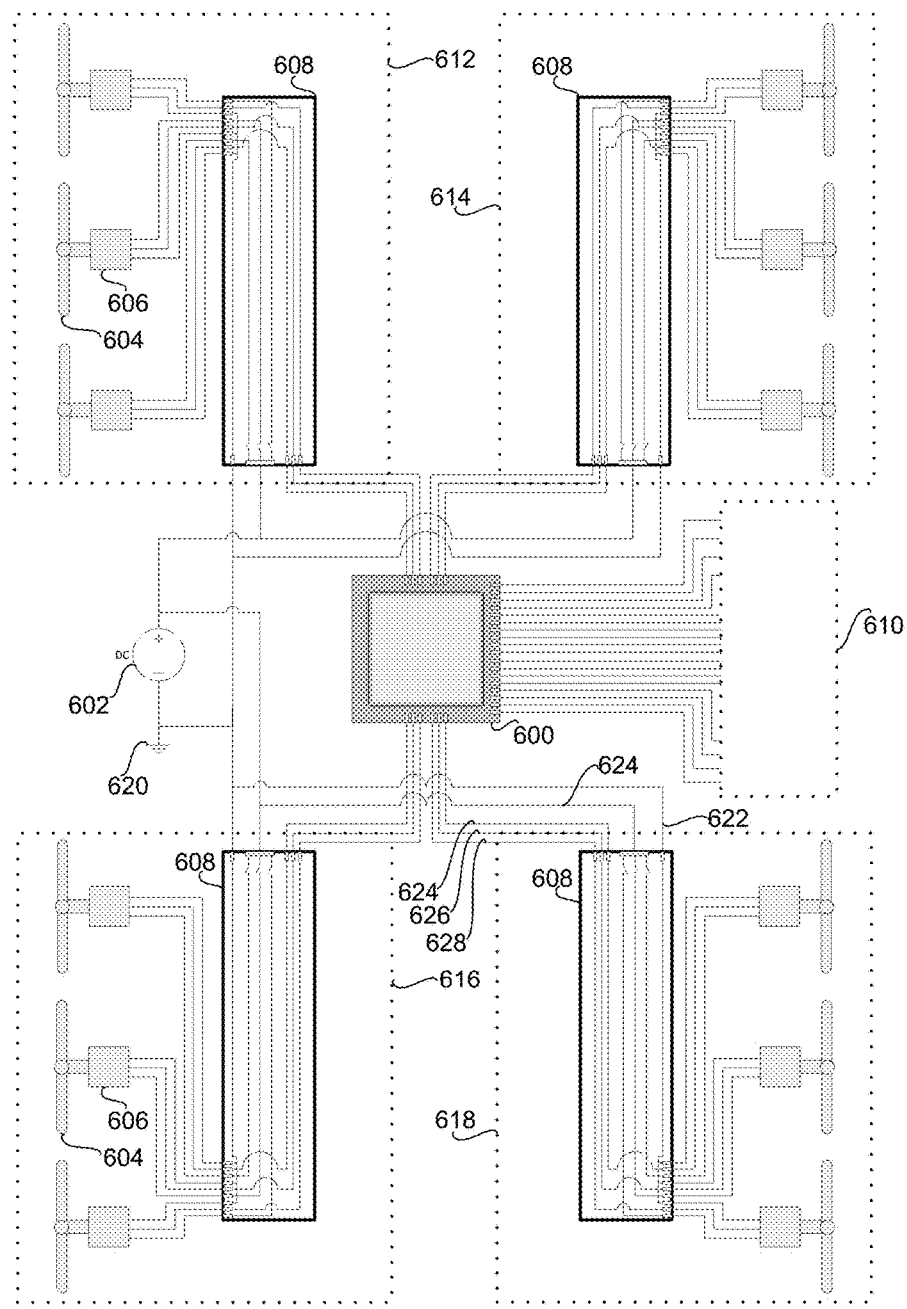
FIG. 6 is a simplified circuit diagram of an electrical system of an unmanned aerial vehicle, according to an example embodiment.

FIG. 6 is a simplified circuit diagram of an electrical system of an unmanned aerial vehicle, according to an example embodiment. In this example, the processor module includes a single processor 600. The single processor interacts with a plurality of sensors of sensor module 610. The sensor module 610 may include a plurality of sensors, each sensor having sensor data that the processor 600 may use to make control decisions. The processor may send signals to a plurality of PCBs 608 of the UAV. Also included in the present example is a power source 602.

Both the processor 600 and the power source 602 may be electrically coupled to each PCB 608. The power hubs of each PCB may be connected in parallel via a high voltage end of the power source and a low voltage end of the power source. The low voltage end connects to the PCBs via electrical lead 622, and the high voltage end connects to the PCBs via electrical lead 624. In the present example, the low voltage end of the power source corresponds to a ground 620. In some examples, the ground 620 may be local to the power source. In other examples, the ground 620 may be a common ground of the UAV.

Each of the PCBs 608 of the present embodiment includes selector switches. In this way, the power hub of each PCB may serve as a bus bar of the UAV. For example, when all selector switches of a PCB are engaged, each corresponding propeller 604 may have access to power from the power source, and may translate the electrical power to mechanical movement of a rotor and blades of the propeller. When each selector switch is engaged, each of the propellers of the PCB may be connected in parallel via the power hub of the PCB. Engaging or disengaging the selector switches may change the impedance of the power hub by removing or adding parallel impedances associated with each propeller. The PCBs 608 and processor 600 may be configured to detect the state of the selector switches and control motor controllers 606 of the propellers 604 based on the detected state of the selector switches. Further, in some examples, the selector switches may be controllable by the processor 600. In other examples, the selector switches may engage or disengage based on circuitry of the power hub.

FIG. 6 further illustrates control zones 612, 614, 616, and 618, each containing three propellers 604 controllable by the processor 600. Each of the control zones may be associated with a different structural element of a UAV. For example, each of control zones 612, 614, 616, and 618 may be associated with a separate boom arm of the UAV. Each of the PCBs 608 receives signals from the processor 600 via control leads 624, 626, and 628. Each of the control leads corresponds to a separate propeller. The signals from processor 600 may instruct individual propellers to rotate at different rotational velocities based on a desired movement of the UAV or in response to environmental factors detected from the sensor data of sensor module 610. For example, signals to the propellers 604 of control zones 612 and 614 may control the propellers 604 to rotate at a slightly lower velocity than the propellers 604 of control zones 616 and 618 to produce a desired movement in the UAV. In another example, the sensor data may be indicative of a windy environment of the UAV. The processor module may apply a proportional-integral-derivative (PID) control to the propellers to correct for the effects of the wind. Other types of control mechanisms may be applied as well.

In some examples, each propeller of a control zone may receive the same control signals from processor 600. In these embodiments, each propeller of the control zone may receive the signals from a single signal line of a signal hub of the PCB. In other examples, individual propellers 604 in a control zone may be separately controllable by processor 600. In these examples, each propeller may receive signals from an individual line of a signal hub of the PCB. In the present example, each propeller 604 receives signals from an individual line.

In another aspect of the present embodiment, each propeller 604 includes a motor controller 606. Each motor controller 606 may receive the control signals from the processor 600 via signal hubs of the PCBs 608. The motor controller may control an associated propeller 604 based on the received signals. In some examples, the motor controller 606 may send signals back to the processor 600. For example, the motor controller may detect a rotational velocity of the propeller 604 and send a signal to the processor 600 indicative of the rotational velocity. The processor 600 may include this information in making subsequent control decisions and sending subsequent control signals. In these examples, the signal hub of each PCB 608 may be configured to send information from the motor controllers back to the processor 600.

In other examples, the propellers may not include individual motor controllers. For example, the propellers may include motors that translate electrical power into mechanical movement. Thus, the rotational velocity of the propellers may be controlled by varying the voltage and current sent to the propeller via the power hub. In other examples, a duty cycle may be used to vary the average voltage received by the propeller via the power hub. In these examples, control signals of the processor module may control switches of the power hub to produce a desired duty cycle. In this way, the processor module, in conjunction with the PCB, may act as a motor controller for the individual propellers. Other examples of operating the propellers without individual motor controllers are possible as well.

Figure 7:
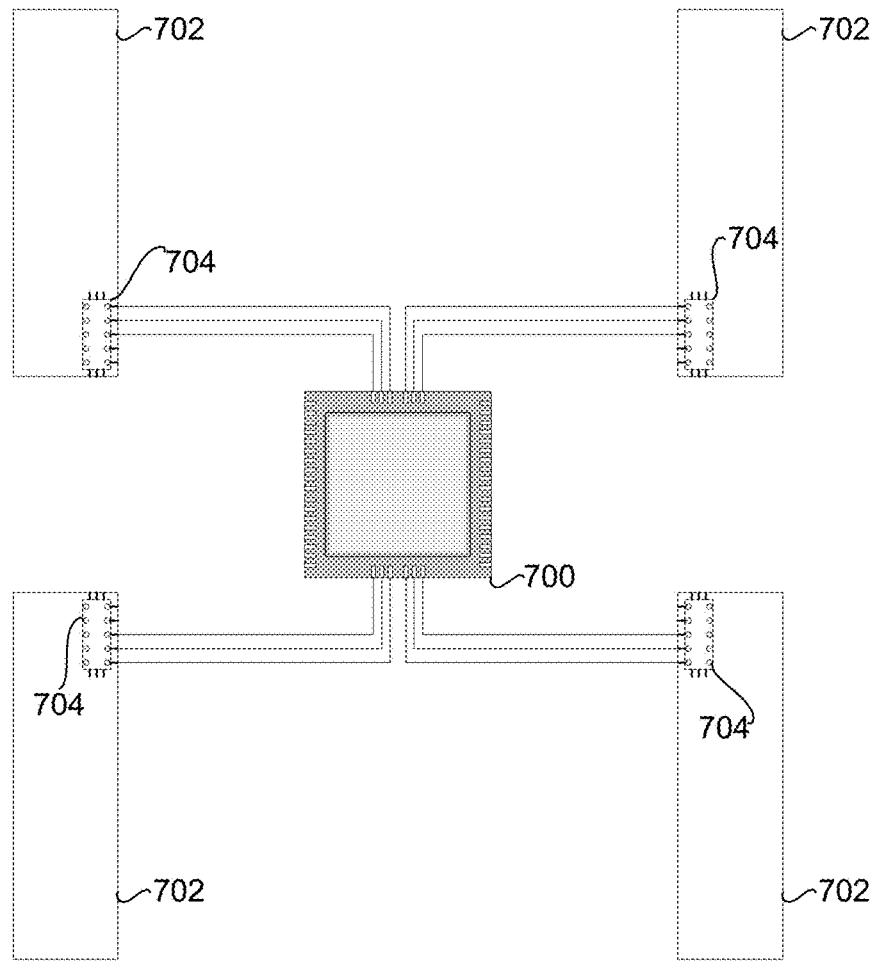
FIG. 7 is a simplified diagram of a processor module of an unmanned aerial vehicle, according to an example embodiment.

FIG. 7 is a simplified diagram of a processor module of an unmanned aerial vehicle, according to an example embodiment. In some examples, such as the configuration illustrated in FIG. 6, the processor module may only include one central processor of a UAV. In other examples, the processor module may include individual processors associated with each of a plurality of PCBs. In the present example, the UAV includes a central processor 700, but also includes processors 704 of a plurality of PCBs 702. Other configurations of processors are possible as well.

In the present example, the central processor 700 may act as a central processing unit of a controller area network (CAN) bus of the aerial vehicle. Further, the PCBs 702 may act as nodes of the CAN bus. Still further, the processors 704 may act as CAN controllers and CAN transceivers of the CAN bus. In this configuration, the processor module of the UAV may act as a CAN bus operable to convey information and instructions among the various nodes and the central processing unit.

In other examples, the central processor 700 may simply send instruction signals or convey sensor data to processor 704, which may in turn send control signals to corresponding propellers of the PCB 704. In these examples a sensor module of the UAV may include sensors that communicate directly with individual processors 704, while others communicate with the central processor 700. For example, the PCBs may each be associated with a boom arm. Each boom arm may include one or more sensors. The sensors of the boom arms may be electrically coupled to the processors 704 of PCBs 702. Further, the central processor 700 may be incorporated into a fuselage of the UAV. Other sensors of the UAV may be electrically coupled to the central processor. Other sensor configurations are possible as well.

Figure 8A:
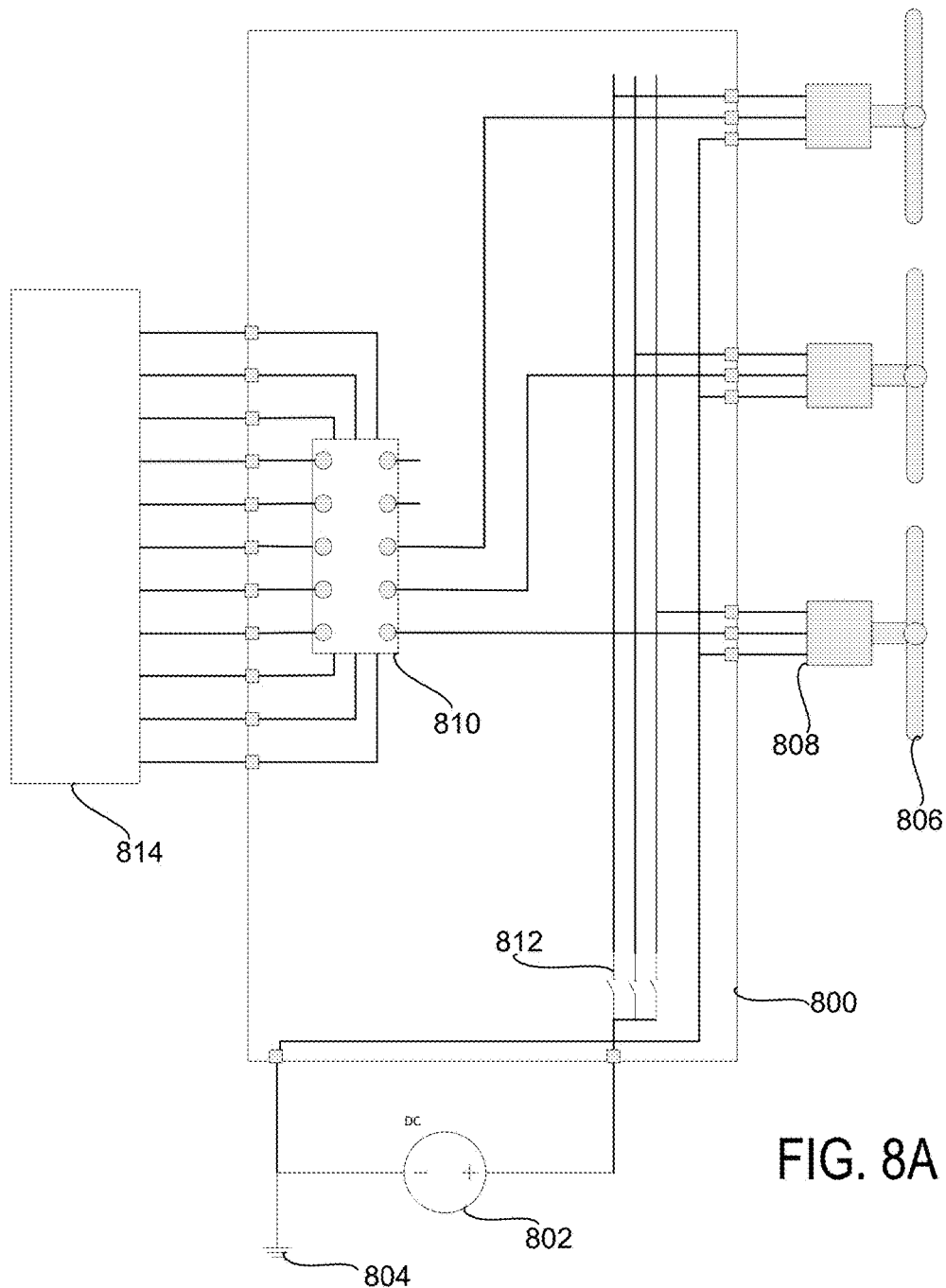
FIGS. 8A, 8B, and 8C are simplified circuit diagrams of a printed circuit board of an unmanned aerial vehicle, according to an example embodiment.

FIG. 8A is a simplified circuit diagram of a printed circuit board of an unmanned aerial vehicle, according to an example embodiment. The PCB 800 may be electrically coupled to power source 802 via a high voltage end and a low voltage end of the voltage source. The low voltage end of power source 802 may correspond to a ground 804. In other examples, the low voltage end may not correspond to a ground. The PCB 800 may be configured to transfer power from the power source 802 to the propellers 806. Further included in the present example is a processor 810. The processor is electrically coupled to contact block 814. The contact block 814 may include signals from sensors of the UAV or signals from other processors of the UAV. For example, processor 810 may communicate signals to, and receive signals from, other processors of a processor module of the UAV, and one or more sensors of a sensor module of the UAV. The PCB 800 may be configured to transfer signals from the processor 810 to the propeller 806. In the present example, the PCB 800 transmits the signals to the propellers 806 via motor controllers 808. In other examples, the signals may be transmitted without motor controllers 808.

Figure 8B:
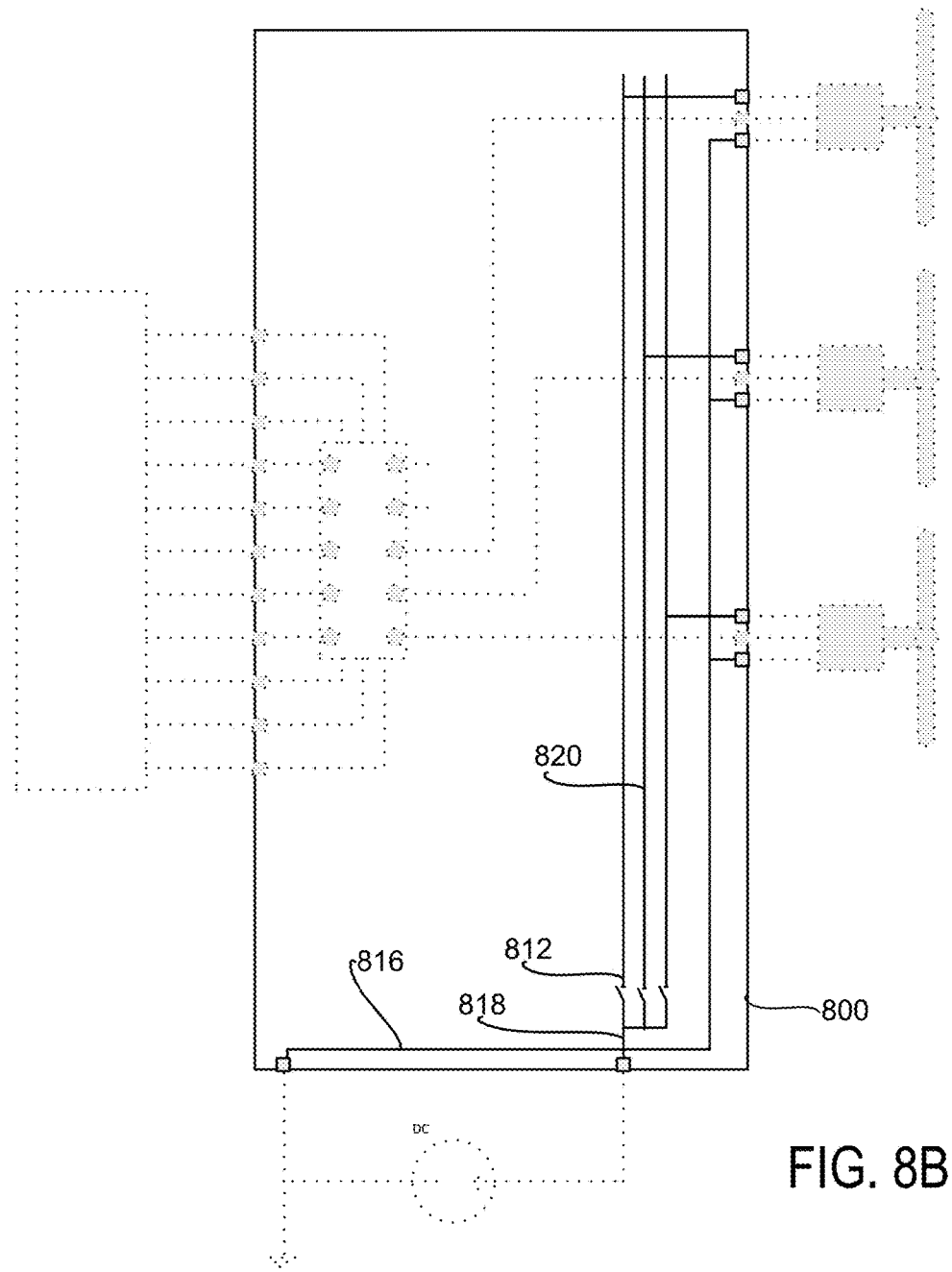

FIG. 8B is a simplified circuit diagram of a power hub of a printed circuit board of an unmanned aerial vehicle according to an example embodiment. The power hub includes a low voltage line 816 and a high voltage line 818. The low voltage line 816 is directly couplable to each of the propellers. The high voltage line is split into three power transfer lines 820, each corresponding to a separate propeller. Each power transfer line 820 is selectively engaged based on a selector switch 812. An engaged power transfer line 820 may transfer power to a corresponding propeller, while a disengaged power transfer line may not. Selectively engaging the selector switches 812 may be based on control signals from the processor module. However, circuitry of the power hub may be used to engage or disengage the selector switches. For example, the power hub may include fuses or voltage comparators to ensure that the propellers do not receive an overly-high voltage that may damage the propellers.

Figure 8C:
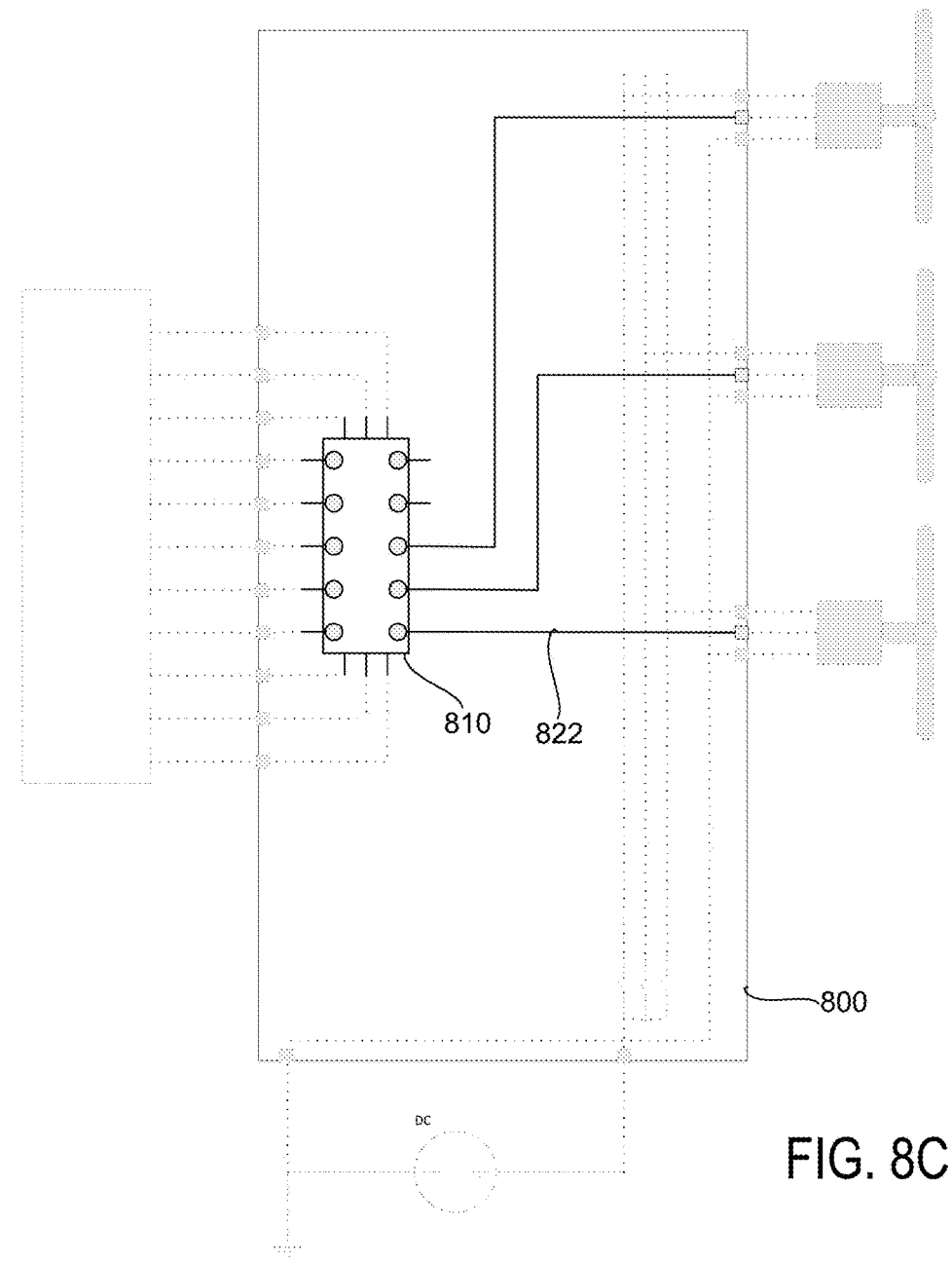

FIG. 8C is a simplified circuit diagram of a signal hub of a printed circuit board of an unmanned aerial vehicle according to an example embodiment. In the present example, the signal hub simply includes signal lines 822 running from processor 810 to motor controllers of corresponding propellers. In other examples, the signal hub may be configured to manipulate a duty cycle of the propellers based on control decisions of a processor module of the UAV conveyed via control signals of processor 810. For example, the signal hub may include its own processor, such as a microprocessor. The processor of the signal hub may be configured to receive a signal, such as a pulse-width modulation (PWM) signal, from the processor module, and interpret it to facilitate control of the propellers by the processor module. Other configurations of the signal hub are possible as well.

V. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. An unmanned aerial vehicle comprising:
   a power source;
   a processor module comprising one or more processors; and
   a plurality of boom arms, each boom arm being physically connected to a printed circuit board (PCB) and a plurality of propellers;
   wherein a PCB of each boom arm comprises a power hub electrically connected to the power source and to corresponding propellers of the boom arm, and a signal hub electrically connected to at least one processor of the one or more processors and to the corresponding propellers;
   wherein the power hub of each PCB comprises a plurality of selector switches corresponding to each of the plurality of corresponding propellers, wherein the power hub of each PCB is configured to transfer power from the power source to the corresponding propellers when the selector switches are in the engaged state, and wherein the signal hub of each PCB is configured to transfer signals from the one or more processors to the corresponding propellers, wherein the processor module controls the plurality of propellers.

2. The UAV of claim 1, further comprising a sensor module comprising at least one sensor, wherein the sensor module is electrically connected to the processor module, and wherein the signal hub of each PCB is configured to transfer signals from the processor module to the corresponding propellers, wherein the processor module controls the plurality of propellers based at least in part on sensor data of the sensor module.

3. The UAV of claim 2, further comprising a wing and a fuselage, wherein the wing and fuselage each comprise one or more sensors of the sensor module, and wherein the wing further comprises a plurality of propellers controllable by the processor module.

4. The UAV of claim 2, wherein the PCBs of the UAV are incorporated into the wing, and wherein each PCB is electrically connected to the corresponding propellers via electrical leads connected to the booms.

5. The UAV of claim 1, wherein each PCB that corresponds to a boom arm further comprises a processor, and wherein the processor module of the UAV comprises the processors of each PCB and a central processor of the UAV.

6. The UAV of claim 5, wherein the PCB associated with each boom arm is further configured to serve as a controller area network (CAN) bus node of the UAV.

7. The UAV of claim 1, wherein at least one of the boom arms further comprises a tail and a servo, wherein the tail moves based on movement of the servo, and wherein the signal hub of the PCB associated with the at least one boom arm is configured to transfer signals from the processor module to the servo, wherein the processor module controls the movement of the servo.

8. The UAV of claim 1, wherein the plurality of boom arms consists of four boom arms, and wherein each of the four boom arms comprises three propellers.

9. The UAV of claim 1, wherein the PCBs are connected in parallel via a high voltage end of the power source and a low voltage end of the power source.

10. The UAV of claim 1, wherein the corresponding propellers are connected in parallel via the power hub when the selector switches are in the engaged state.

11. The UAV of claim 1, wherein the one or more processors are configured to control motor controllers that correspond to the plurality of corresponding propellers based on an engagement state of one or more of the selector switches.

12. The UAV of claim 1, wherein the processor module is configured to control each of the selector switches of the power hub to produce a duty cycle, wherein the processor module serves as a motor controller for each of the corresponding propellers.

13. An electrical system of an unmanned aerial vehicle comprising:
a power source;
a processor module comprising one or more processors;
a plurality of propellers comprising a plurality of subsets of propellers, wherein each subset of propellers corresponds to one of a plurality of boom arms of the UAV; and
a plurality of printed circuit boards (PCBs), wherein each PCB of the plurality corresponds to one of the plurality of boom arms;
wherein a PCB of each boom arm comprises a power hub electrically connected to the power source and to a corresponding subset of propellers of the boom arm, and a signal hub electrically connected to at least one processor of the processor module and to the corresponding subset of propellers;
wherein the power hub of each PCB comprises a plurality of selector switches corresponding to each of the corresponding subset of propellers, wherein the power hub of each PCB is configured to transfer power from the power source to the corresponding subset of propellers when the selector switches are in an engaged state, and wherein the signal hub of each PCB is configured to transfer signals from the processor module to the corresponding subset of propellers, wherein the processor module controls the plurality of propellers.

14. The electrical system of a UAV of claim 13, further comprising a sensor module comprising at least one sensor, wherein the sensor module is electrically connected to the processor module, and wherein the signal hub of each PCB is configured to transfer signals from the processor module to the corresponding propellers, wherein the processor module controls the plurality of propellers based at least in part on sensor data of the sensor module.

15. The electrical system of a UAV of claim 13, wherein the processor module comprises a central processor and a plurality processors associated with the PCBs, wherein the central processor serves as a central processing unit of a controller area network (CAN) bus, each PCB serves as a CAN node of the CAN bus, and each processor associated with a PCB serves as a CAN controller and transceiver of the associated CAN node.

16. An electrical system within a wing of a UAV comprising:
a power source;
a processor module comprising one or more processors; and
a plurality of printed circuit boards (PCBs);
wherein the plurality of PCBs each comprise a power hub electrically connected to the power source and to a plurality of propellers, and a signal hub electrically connected at least one processor of the processor module and to the plurality of propellers;
wherein the power hub of each PCB comprises a plurality of selector switches corresponding to each of the plurality of propellers, wherein the power hub of each PCB is configured to transfer power from the power source to the plurality of propellers when the selector switches are in an engaged state, and wherein the signal hub of each PCB is configured to transfer signals from the processor module to the plurality of propellers associated with the PCB, wherein the processor module controls the plurality of propellers.

17. The electrical system within a wing of a UAV of claim 16, further comprising a sensor module comprising at least one sensor, wherein the sensor module is electrically connected to the processor module, and wherein the signal hub of each PCB is configured to transfer signals from the processor module to the propellers associated with the PCB, wherein the processor module controls the plurality of propellers based at least in part on sensor data of the sensor module.

18. The electrical system within a wing of a UAV of claim 16, wherein the PCBs are incorporated into the wing during an injection molding process of the wing.

19. The electrical system within a wing of a UAV of claim 16, wherein the plurality of PCBs are connected to the plurality of propellers via electrical leads of a plurality of boom arms of a UAV.

20. The electrical system within a wing of a UAV of claim 16, further comprising a plurality of propellers of the wing, wherein the plurality of propellers of the wing are controllable by the processor module.

* * * * *